May 2, 1933.  E. MEYER  1,906,397
METHOD OF MAKING A BELT
Filed Jan. 9, 1931
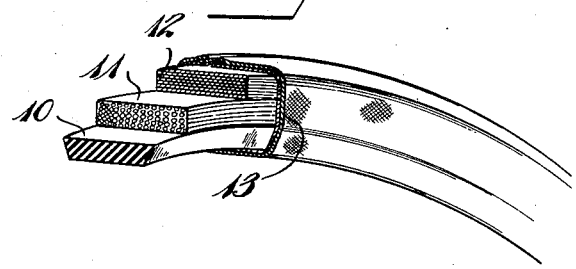
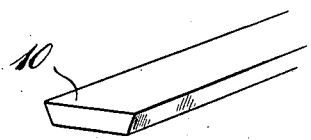
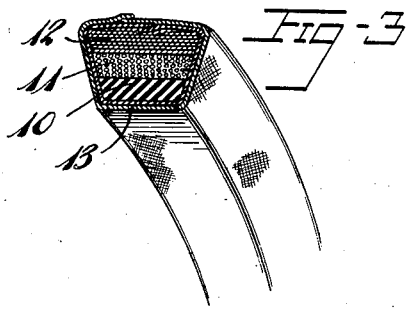
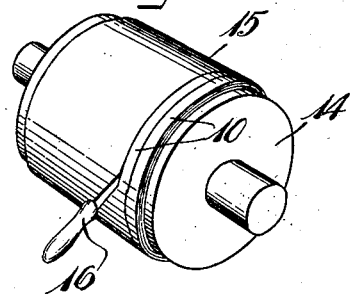
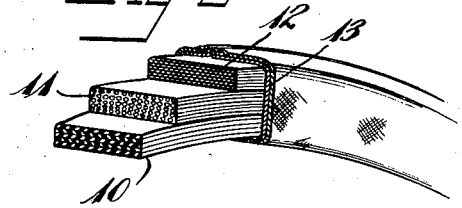
Inventor
Ernest Meyer
By Eakin & Avery
Attys.

Patented May 2, 1933

1,906,397

UNITED STATES PATENT OFFICE

ERNEST MEYER, OF AKRON, OHIO, ASSIGNOR TO THE B. F. GOODRICH COMPANY, OF NEW YORK, N. Y., A CORPORATION OF NEW YORK

METHOD OF MAKING A BELT

Application filed January 9, 1931. Serial No. 507,608.

This invention relates to belts and especially side-driving belts such as are employed for driving the fans of automobiles, for example.

It is important that such belts be of uniform structure throughout their length, that the strength-giving elements be concentrated in the region of the "neutral axis" of the belt, that being the region of the belt which is not subjected to great variation in longitudinal tension or compression by the flexing of the belt about the pulley, and that the strength-giving elements be symmetrically disposed in the cross-section of the belt at all positions along the belt, in order that the belt may run true, without whipping, without excessive localized wear, and without excessive strain being imposed upon individual strength-giving elements.

For avoidance of stretch and for flexibility of the belt in conjunction with strength, the strength-giving elements preferably consist of cords extending side-by-side longitudinally of the belt and separated from each other by rubber so that locally they may move longitudinally with relation to each other in the action of the belt without substantial friction other than the internal friction of the rubber.

In order to provide suitable distribution of the gripping pressure of the belt against the pulley walls throughout the radial depth of the belt and at the same time have the belt take a determinate position radially of the pulley groove it has been found desirable to construct the belt so that it will have transverse compressibility graduated from one periphery to the other, so that the peripheral portion having the least transverse compressibility will determine the depth at which the belt will lie in the groove while the more compressible zones of the belt, because of their resilient deformability, will exert approximately their intended gripping force against the pulley walls even though the radial taper of the belt in its unstrained condition is not perfectly coordinated with that of the pulley groove.

Preferably the graduated transverse compressibility is provided by employing a filler of relatively thin, bias-cut, square-woven fabric in the outer peripheral region of the belt, outside of the "neutral axis" portion consisting of straight-laid cords embedded in rubber, and employing a filler of rubber without or substantially without fiber in the inner peripheral region of the belt, the three elements mentioned being enclosed in a cover which preferably is of relatively heavy, square-woven, bias-cut, rubberized fabric, and the rubber filler at the inner periphery of the belt, by reason of its high degree of deformability, being adapted to spread laterally and thus tighten the grip of the belt in the pulley groove as a result of its being put under longitudinal compression by the flexing of the belt to the curvature of the pulley at the point of tangency where it passes onto the pulley and, conversely, to narrow and thus readily release itself from the pulley groove at the point of tangency where the belt leaves the pulley, so that tearing away of the strength-giving elements from it is avoided.

For economy of manufacture such belts heretofore have been made by winding in superposed relation upon a cylindrical form a layer of unvulcanized rubber composition, a layer of weak-wefted or weftless cord fabric and a layer of bias-cut, square-woven rubberized fabric, then cutting the structure transversely into a plurality of annular belt cores of rectangular cross-section, then wrapping each core with a cover of bias-cut, square-woven rubberized fabric, and then shaping the structure to the trapezoidal cross-sectional form of the final belt by molding and vulcanizing it.

As the molding of the structure of rectangular cross-section to the trapezoidal form has involved a flow of the filler rubber from the inner periphery past the cord fabric element, the symmetrical arrangement of the cords has been destroyed and the desirable characteristics of the belt as a whole which are above set out have been seriously interfered with.

The chief object of my invention is dependably and accurately to obtain in the finished belt the characteristics referred to. A further object is to obtain those characteristics without excessive cost.

Of the accompanying drawing:

Fig. 1 is a perspective view of a section of the assembled elements comprising the belt of my invention before being subjected to the molding operation.

Fig. 2 is a perspective view of a section of the resilient belt core element.

Fig. 3 is a perspective view of a section of the belt of my invention after the molding operation has been performed.

Fig. 4 is a diagrammatic illustration of a step in the operation of building a belt, and Fig. 5 is a perspective view similar to Fig. 1, illustrating a modified form of construction.

I attain the above stated objects in the preferred form of my invention by so shaping the inner filler element that substantial flow of the material of it is not required in the molding of the belt as a whole and in partially vulcanizing it before it is incorporated in the belt structure so that in the outward stretching of the cords in the molding and vulcanizing operation the relative flow of the filler material and the cutting of the cords into it are adequately resisted.

Referring to the drawing, and especially to Fig. 1, the belt of my invention includes a rubber belt-core element 10, on which is superimposed a belt-core element 11 comprising a plurality of layers of cords or cord fabric and a belt-core element 12 formed of layers of square woven fabric, all of which belt-core elements are enclosed in a cover 13 of square woven fabric having its warp and filler threads preferably extending in a direction angular to the belt.

The belt core element 10 may be made by extruding a rubber compound through a suitable die to produce a strip of trapezoidal cross-section as illustrated in Fig. 2 and such strip may be then subjected to a partial vulcanization in any well known manner, such as by packing it in powdered soapstone and then vulcanizing it in an open steam vulcanizer. Other methods may be used, such as illustrated in Fig. 4, wherein is represented a drum or mandrel 14 on which a calendered sheet of vulcanized rubber has been wound upon itself in several convolutions to produce a cylinder 15 of the desired thickness and from which belt core elements 10 may be cut, by use of a knife 16, either before or after the cylinder has been partially vulcanized. The belt-core elements so formed may be either of trapezoidal cross-section, as in Figs. 1 and 2, or of rectangular cross-section as in Fig. 5. Before building such belt-core elements into a belt structure I contemplate partially vulcanizing the same to at least such a degree that the rubber compound comprising the belt-core element will be so changed in its characteristics as to resist flow when subjected to molding forces. I further provide against flow of the belt-core element under pressure by so proportioning its cross-sectional area that only relatively small deformation of the element is necessary in the molding of the belt. This I accomplish either by making the element of rectangular shape and of such width that its edgewise compression will be relatively small or by forming it of trapezoidal cross-section having sides of equal angularity to that of the desired belt and of such width as to be confined in the mold without appreciable edgewise compression.

Having produced the rubber belt core element, the layers of cords or cord fabric, and the layers of square woven fabric constituting the fibrous belt-core element, are assembled thereon in any desired manner such as by assembling them upon a drum similar to that shown in Fig. 4. The fibrous belt-core element is preferably formed of rectangular cross-section as shown in Fig. 1. The cover 13 of bias-cut fabric is then applied in any well known manner and the assembled belt is subjected to vulcanization in a mold of the proper shape.

In the vulcanizing process the closing of the mold produces a laterally applied pressure under which the belt is confined while the necessary heat is applied. I find that by partially vulcanizing the belt core element 10, especially when such element is made of trapezoidal cross section, the said element flows as a solid, as distinguished from fluid flow, when subjected to such pressure and displacement of the rubber comprising said element, that flow around the cords 11 or therebetween is prevented and the element 10 acts to evenly press all of the cords 11 in an outward direction to evenly tension them in the belt.

I claim:

1. The method of making a belt which comprises forming an annular belt-core element of substantially rectangular cross-section comprising rubber and textile material, forming another belt-core element comprising rubber of tapered cross-section and partially vulcanizing it in that form, assembling the said elements and wrapping them in a cover of sheet material, and thereafter molding and vulcanizing the resulting structure to trapezoidal cross-sectional form.

2. The method of making a belt which comprises forming an annular belt-core element of substantially rectangular cross-section comprising rubber and textile material, forming another belt-core element comprising partially vulcanized rubber of tapered cross-section, assembling the said elements and wrapping them in a cover of sheet material, and thereafter molding and vulcanizing the resulting structure to trapezoidal cross-sectional form.

3. The method of making a belt which comprises forming an annular belt-core element comprising unvulcanized rubber and substantially straight-laid cords, forming another belt-core element consisting essentially of soft-rubber composition, partially vulcanizing said last named element to substantially its final shape, assembling the belt-core elements, and vulcanizing the belt under confining pressure.

4. The method of making a belt which comprises preparing a belt body comprising a strength-giving core element and a partially vulcanized rubber cushion element of tapered cross-sectional form, applying a fibrous cover to said belt body and vulcanizing the resulting structure in trapezoidal cross-sectional form.

In witness whereof I have hereunto set my hand this 2nd day of January, 1931.

ERNEST MEYER.